July 9, 1935.    S. P. MILLER    2,007,378
CUTTING BACK PITCH IN TWO STAGES
Filed July 31, 1929    3 Sheets-Sheet 1

INVENTOR
Stuart Parmelee Miller
BY
Pennie Davis Marvin + Edmonds
ATTORNEYS

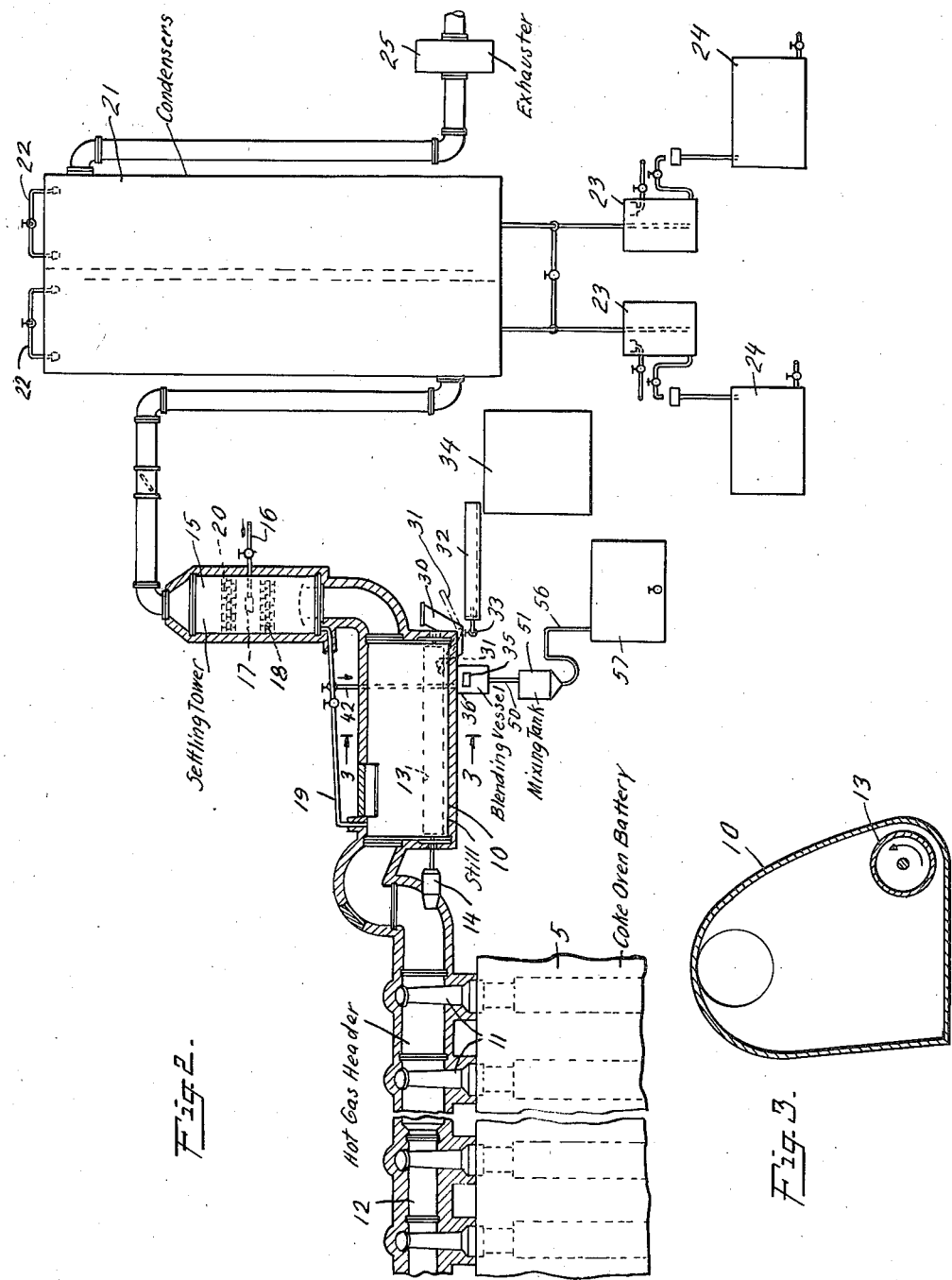

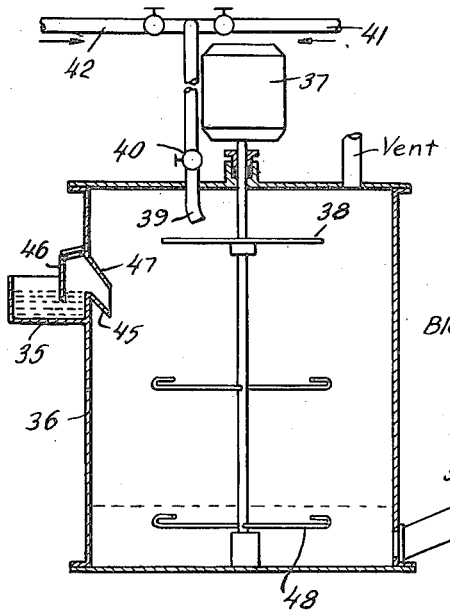
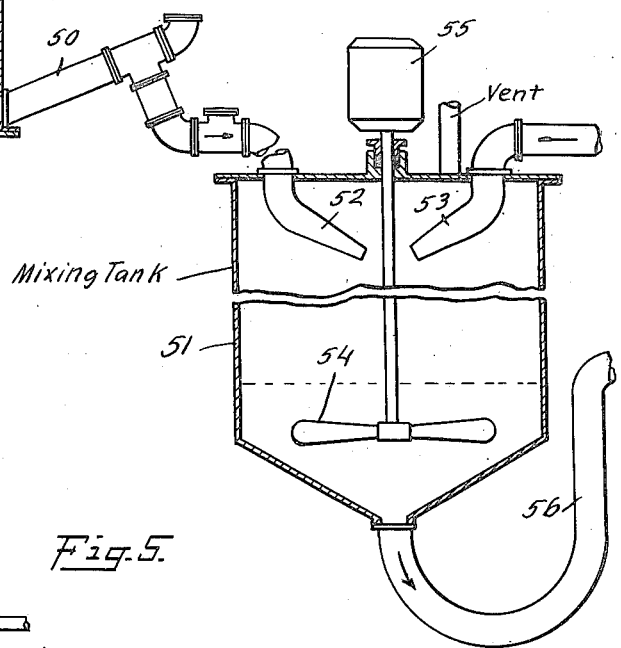
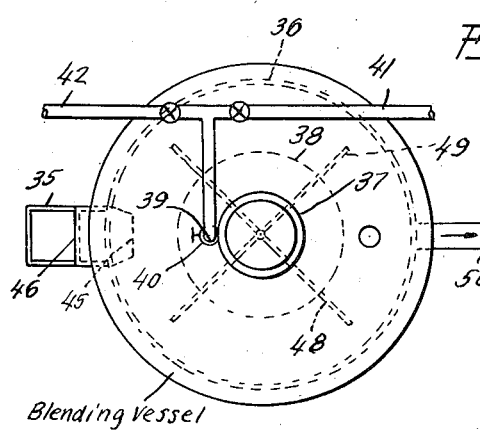
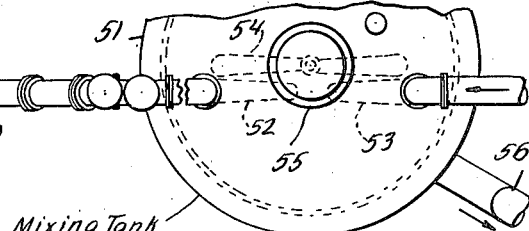

Patented July 9, 1935

2,007,378

UNITED STATES PATENT OFFICE 2,007,378

CUTTING BACK PITCH IN TWO STAGES

Stuart Parmelee Miller, Englewood, N. J., assignor to The Barrett Company, New York, N. Y., a corporation of New Jersey Application July 31, 1929, Serial No. 382,376

10 Claims. (Cl. 202—76)

This invention relates to a continuous method of blending a hot high melting point pitch with a hydrocarbon flux to prepare blended products of desired properties. The invention includes the process and apparatus for carrying out the process.

When a hot, thinly fluid high melting point pitch is blended with a relatively large amount of hydrocarbon flux which is cold, or considerably colder than the pitch, the temperature of the pitch may be lowered to a point where it separates from the mixture without forming a homogenous blend with the flux. A gelatinous mass known as "liver" will form in the mixing tank and seperate out from the solution in the tank. When once the liver has separated from the pitch a homogeneous mixture cannot thereafter be formed without a considerable expenditure of time and money. Because of the formation of this so-called liver, it has not been possible to blend a large amount of a hydrocarbon flux with a pitch of high melting point as a continuous process without first heating the flux to a high temperature. I have found that by blending the pitch and flux in a plurality of stages, as, for example, in two stages, a homogeneous blend may be prepared continuously, even with relatively cold flux.

The amount and composition of the hydrocarbon flux employed may be the same in each stage of the blending operation, or a different amount or a flux of different properties may be employed in each stage. Coke oven tar, gas house tar, water gas tar, producer gas tar, etc., or their derivatives, or petroleum residues or crude oils may be employed as the flux.

The flux may be raw tar, i. e. tar as it is obtained from a coke oven operation, for example, which contains several percent of water. The flux may be tar which has previously been subjected to dehydration or partial distillation to remove the water or water and light oils. It may be tar which has been distilled to form a low melting point pitch. Depending upon the product desired, the quantity and quality of the flux employed at each stage of the blending operation may be varied.

The blending operation of this invention is a continuous process. The high melting point pitch and flux of the first stage are continuously added to a mixing tank. The blended product is continuously drawn off and additional flux is added to this blended product to produce a product containing an additional amount of flux. This product may be continuously drawn off from the mixing tank employed for carrying out the second stage of the operation, and where more than two blending stages are to be employed a still further quantity of flux may be added in one or more additional stages. Although various types of mixing tanks may be employed in each of the stages of the blending operation, the drawings show a preferred type for the first stage of the blending operation in which the walls of the vessel are continuously washed down with flux and the pitch is added to the vessel away from the walls, and the contents of the vessel are agitated in such a way as to insure thorough mixing of the ingredients.

*Example 1*

In the first stage of the blending operation, only so much flux is added to the high melting point pitch as will give a homogeneous blend. Each stage of the operation may be continuous, so that the blended product formed in the first stage is drawn off continuously into a second mixing vessel, where it is continuously blended with more flux. The product drawn off into this second mixing tank is a blended product of lower melting point than the high melting point pitch fed to the first stage of the operation. It is lower in temperature than the hot thinly fluid pitch employed in the first stage. Because of its lower melting point it will blend with more flux than could be employed in the first stage of the blending operation without hardening or forming liver, even though the temperature of this second stage of the operation is lower than that of the first stage. I have found that by adding the flux in two stages it is possible to add more flux to the same quantity of pitch than is possible in one stage without causing separation of high melting point pitch. The temperature of the flux added in each stage is lower than the temperature of the pitch employed in the first stage, and the invention is of particular advantage in blending a pitch with a flux which has not been preheated.

Vapors given off during the blending operations may be separately recovered to produce separate distillate oils or they may be combined to produce one distillate oil. As alternative methods the condensate may be returned to the mixing tank, or the vapors may be conducted to condensers employed for condensing distillate from other sources.

The invention is of value in cutting back high melting point pitches prepared by the distillation of tar in hot coal distillation gases. The drawings show an arrangement of blending apparatus in connection with a still for distilling tar by hot coke oven gases at a coke oven battery. When high melting point pitches directly from such a still are cut back according to this invention, the pitch is used hot, preferably in the thinly fluid condition in which it is withdrawn from the still. The gases escaping from the mixing tanks may be blended with the gases and vapors passing to the condensers connected with the still.

The invention is further described in connection with the accompanying drawings, but it is intended and is to be understood that it is not limited to the particular arrangement shown.

In the drawings:

Fig. 2 is an elevation of the still and mixing tanks shown in Fig. 1;

Fig. 3 is a section through the still;

Fig. 4 is an enlarged view of the mixing tanks; and

Fig. 5 is a plan view of the apparatus shown in Fig. 4.

Figure 1:
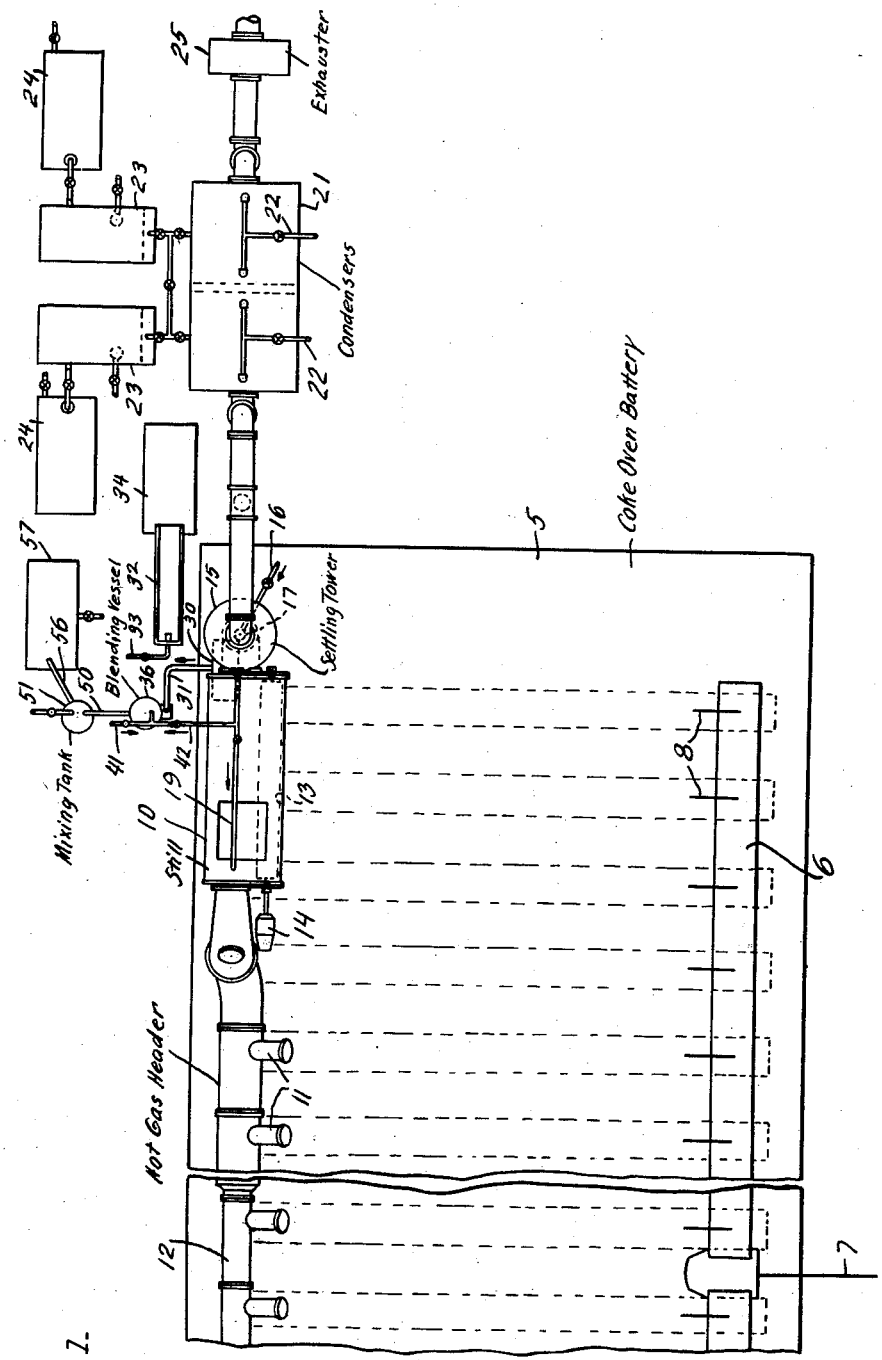
Fig. 1 is the plan view of a coke oven plant equipped with a still for distilling tar with hot coke oven gases to produce a high melting point pitch, and two mixing tanks for continuously blending the pitch with flux.

In the drawings, 5 indicates a coke oven battery equipped with a collector main 6 and crossover main 7 of the usual type. The collector main is connected with each of the ovens through uptake pipes and goose-necks 8. This is shown more or less diagrammatically in the drawings.

At the rear of the battery of ovens is a still 10 employed for distilling tar by direct and intimate contact with the hot coal distillation gases from selected ovens of the battery. These selected ovens are provided with additional uptake pipes 11 at the rear of the ovens. By proper manipulation of valves in the uptake pipes 11 and the uptake pipes 8, gases from these selected ovens may be directed either to the collector main 6 or through the hot gas header 12 into the still 10.

A small body of the material to be distilled is maintained in the bottom of this still 10. Within the still is a roll 13 which is rotated at high speed by the motor 14. Rapid rotation of this roll sprays the material to be distilled from the bottom of the still up into the hot gases. The material is distilled and simultaneously scrubs from the hot gases entrained impurities carried by the gases from the ovens. The gases leaving the still by the tower 15 are substantially free from entrained impurities.

The tar to be distilled is fed into the tower by the line 16 through the spray 17. The incoming tar flows down over baffles 18 and washes from the gases leaving the still any entrained particles of the spray that are carried from the still by the gases. The tar is partially distilled by contact with the hot gases in the tower 15. This partially distilled tar or semi-pitch is drawn off at the bottom of this tower and is fed through the line 19 into the end of the still at which the hot gases enter. Baffles 20 are provided in the tower above the spray 17 to remove any particles of tar from the spray which may be carried up through the tower by the gases.

Beyond the tower any suitable type of condensing means 21 is provided. As here shown it may be an ordinary direct condenser in which the gases are sprayed with water or ammonia liquor from the line 22. Condensate from the condenser together with any unvolatilized ammonia liquor is drawn off into one or more decanters 23 from which the clean oil is separately collected in the storage tank or storage tanks 24. The oil may be collected as a single fraction or by fractional cooling of the gases heavier and lighter fractions may be obtained. Beyond the condensers an exhauster 25 is provided for drawing the gases through the system. Beyond the exhauster means for the recovery of ammonia and light oils (not shown) are provided.

The pitch formed in the still is withdrawn through the coke trap 30 by means of the levelling arm 31. The position of the levelling arm controls the depth to which the material to be distilled is allowed to collect within the still. The pitch may be drawn off into the trough 32 and sprayed with cold water from the line 33 in which case the pitch is granulated and may be collected in any suitable storage tank 34. When the pitch is blended with flux, according to this invention, it is not granulated in the trough 32 but by adjusting the outlet from the levelling arm it is discharged into the cup 35. This cup is advantageously insulated, and the whole of the tank 36 may be insulated where desired.

From this cup the high melting point pitch in a hot thinly fluid condition is discharged into the blending tank 36 for the first stage of the blending operation. Inside of this blending tank is a vertical shaft which is rotated at a speed of some 400 or 500 R. P. M. by suitable driving means such as the motor 37. Near the top of the shaft within the tank is a disc 38. The flux employed in the first stage of the blending operation is fed onto this disc from the feed pipe 39. The rate at which the flux is fed onto the disc may be regulated by the valve 40. This flux may be a heavy oil or tar or semi-pitch supplied through the line 41. As shown in the drawings, semi-pitch from the bottom of the settling tower 15 may be supplied to the blending tank through the line 42. The flux as it is fed onto the disc 38 is thrown by centrifugal force from the disc and in the form of a thin sheet washes down the walls of the mixing tank. The flux is thus blended with the small body of material retained within the mixing tank and is fed in at the circumference of this body of material. The pitch is fed to the tank from the cup 35 by the spout 45.

In order to prevent the escape of vapors from the mixing tank through the pitch inlet a lip 46 is arranged to dip into the pitch forming a seal so that the incoming pitch flows under this lip 46 and out into the mixing tank through the spout 45. A baffle 47 is provided to prevent the flux mixing directly with the pitch as the pitch enters the mixing tank. The spout 45 is so arranged that the pitch is admitted to the contents of the tank away from the wall, and is thus prevented from being cooled by premature contact with the relatively cold flux and forming a hardened mass before it can be blended. An agitating arm 48 is provided in the lower part of the blending tank to thoroughly stir the contents of the tank and one or more foam breakers 49 prevent formation of a deep foam layer within the tank.

The product from the first stage of the blending operation is withdrawn through the outlet 50 which is so arranged that a small body of blended or partially blended material is retained within the blending tank at all times. The product from this first stage of the blending operation is blended with a further amount of flux in the second stage of the blending operation. The second stage may be carried out in a mixing tank similar to that shown at 36 for the first stage of the operation or a different type of mixing tank may be employed. The tank shown at 36 is desirable where high melting point pitch is to be blended with cold flux. In the second stage of the blending operation high melting point pitch is not involved and therefore there is not the same need of a specially designed mixing tank. The additional flux and the product of the first stage of the blending operation may be admitted to a mixing tank such as that shown at 51 and be blended therein merely by directing separate streams of the different materials supplied through the nozzles 52 and 53 toward one another and by providing sufficient agitation of the contents of the tank. There will be some mixing of the material from the nozzles before the material comes in contact with the contents of the mixing tank 51. A suitable agitator 54 driven by the motor 55 is provided to insure thorough blending in the tank. The finished product is drawn off continuously through the outlet 56 to suitable storage 57. Where the operation is carried on in more than two stages additional mixing tanks are provided.

The first stage of the blending operation is so regulated that the temperature of the pitch is sufficient to raise the temperature of the flux and form a homogeneous blend without cooling the pitch to the point where there will be separation of liver. The homogeneous blend thus formed may then be further cooled by addition of further flux without danger of liver separating. In the second stage the flux may be added in any quantity which will blend with the blended product from the first stage without separation of liver.

Various pitches and fluxes may be blended, and in varying proportion, depending upon the final product desired. Within the still, for example, pitch of a high melting point, 350 or 400° F. or higher, may be prepared by the distillation of tar.

In preparing road pitch, for example, tar from the line 16 may be supplied through the settling chamber 15 and the line 19 to the still 10. The hot gases leaving the still will partially distill the tar before it leaves the settling tower so that the product admitted to the still 10 through the line 19 is a partially distilled tar. This partially distilled product may all be added to the still or according to a preferred method of operation for preparing road tar, a portion of this partialy distilled product may be used as flux in the first stage of the blending operation and in this case the operation is advantageously so controlled that the tar is distilled in the settling tower 15 to produce pitch with a melting point of about 100° F. The pitch is divided at the bottom of the settling tower, a part passing through the line 19 to the still 10 and a part passing through the line 42 to the mixing tank 36.

In the still the low melting point pitch is further distilled and pitch of 400° F. melting point results. This pitch is fed to the mixing tank 36 through the cup 35. The 400° F. pitch and the 100° F. pitch are advantageously blended in the mixing tank in such proportions that the product drawn off from the first stage of the blending operation through the line 50 contains about 21–22% of the 400° F. pitch. This product is fed to the mixing tank 51 through the nozzle 52 and is blended therein with tar in proper proportions to give a pitch suitable for road-treating purposes. The tar supplied through the line 53 for the second stage of this blending operation may advantageously be tar from which moisture and light oils have been removed by partial distillation.

Instead of employing low melting point pitch as the flux in the first stage of the blending operation, raw tar may be employed. This tar may be fed through the line 41. In preparing roofing pitch, for example, tar may be blended with 400° F. melting point pitch from the still 10 in such proportions that the product drawn off from the mixing tank 36 through the line 50 contains 27–29% of the 400° F. pitch. This will give a base with a melting point of about 180° F. This base may then be further blended with more raw tar in the proportions necessary to produce the roofing pitch desired.

The proportions in which the pitch and flux are blended, at each stage, may be varied. In order to produce a fuel pitch, for example, flux may be added in greater proportions at 53. The base may be blended with a pitch with a melting point of 90° F., for example, for this purpose.

Coke oven tar or gas retort tar may be distilled within the still 10 or water gas tar or tar from other sources may be distilled. The above examples are based upon the use of coke oven tar. Instead of employing hot coke oven gases, hot retort gases may be employed in a direct contact still, or an indirect contact still may be used.

High melting point pitch prepared by any process may be employed in the first stage of the cutting back operation of this invention. The pitch may be employed in the hot thinly fluid condition in which it comes from the still, or high melting point pitch which has been allowed to cool and harden may be melted and supplied in a thinly fluid condition to the first stage of the blending operation.

I claim:—

1. The method of preparing a pitch of high melting point and blending the same with flux in a plurality of stages, which comprises bringing tar into direct and intimate contact with hot coal distillation gases whereby the tar is distilled to pitch of a high melting point, withdrawing the molten pitch continuously from contact with the hot gases, continuously blending a hydrocarbon flux therewith, and then adding further hydrocarbon flux to the blended product while it is still hot.

2. The method of distilling tar to produce pitch of a high melting point and blending the same with a flux in two stages, which comprises passing hot coal distillation gases through a still, bringing the gases into direct and intimate contact with partially distilled tar in the still, passing the resulting enriched gases up through a settling tower, spraying tar into the settling tower and distilling it therein to produce partially distilled tar, feeding a portion of this partially distilled tar to the still to be distilled and feeding the remainder of the partially distilled tar to a mixing tank, distilling the partially distilled tar within the still to produce pitch of high melting point, feeding this pitch while still in a fluid condition to the mixing tank, blending the partially distilled tar and pitch in the mixing tank, continuously drawing off the mixed product from the mixing tank and then blending hydrocarbon flux with the mixed product while it is still hot.

3. The method of producing a road tar by successive steps, which comprises continuously blending hot thinly fluid pitch of high melting point with a flux of lower melting point to produce a homogeneous blend, and then further blending the blended product with a flux.

4. The method of producing road tar, which comprises continuously blending pitch with a melting point in the neighborhood of 400° F. with a pitch with a melting point in the neighborhood of 100° F., and thereafter continuously blending flux with the product thus formed.

5. The method of producing a blended pitch in two stages, which comprises continuously blending pitch of high melting point with a low melting point pitch so as to produce a uniform blended product and continuously blending the blended product with a hydrocarbon flux.

6. The method of producing pitch of a low melting point, which comprises continuously blending pitch with a melting point in the neighborhood of 400° F. with tar and then blending the product with a hydrocarbon flux.

7. The method of producing a pitch of low melting point, which comprises continuously blending a hot thinly fluid pitch of high melting point with a flux of lower temperature to produce a pitch with a melting point in the neighborhood of 180° F. and thereafter blending this pitch with further flux.

8. The method of preparing a blended pitch product by successive steps, which comprises continuously blending a hot thinly fluid pitch of high melting point with an amount of a colder hydrocarbon flux insufficient to cool the pitch to a temperature at which formation of a gelatinous mass occurs thus producing a uniform blended product of the pitch and flux, and then blending hydrocarbon flux with the blended product in at least one additional blending step.

9. The method of preparing a blended pitch product by successive steps, which comprises continuously blending pitch with a melting point of at least 350° F. in a hot thinly fluid condition with a proportion of a colder hydrocarbon flux insufficient to cool the pitch to a temperature at which formation of a gelatinous mass occurs, continuously withdrawing the blended product, and then continuously adding further hydrocarbon flux to the blended product.

10. The method of blending hot pitch with hydrocarbon flux in such proportion and at such a temperature that the pitch would normally be cooled to form a gelatinous mass, which method comprises continuously blending the hot pitch with a proportion of the hydrocarbon flux insufficient to cool the pitch to a temperature at which a gelatinous mass is formed thus producing a uniform blended product of the pitch and flux at a lower temperature than that of the pitch, then further blending the blended product with additional hydrocarbon flux.

STUART PARMELEE MILLER.